United States Patent [19]

Buchleitner

[11] 4,225,903

[45] Sep. 30, 1980

[54] MOTOR VEHICLE HEADLIGHT FOR LOW AND HIGH BEAMS

[75] Inventor: Konrad Buchleitner, Neufahrn, Fed. Rep. of Germany

[73] Assignee: Bayerische Motoren Werke Aktiengesellschaft, Fed. Rep. of Germany

[21] Appl. No.: 904,595

[22] Filed: May 10, 1978

[30] Foreign Application Priority Data

May 10, 1977 [DE] Fed. Rep. of Germany ....... 2720956

[51] Int. Cl.[2] ......................... B60Q 1/00; F21M 3/14; F21V 7/00

[52] U.S. Cl. ..................................... 362/61; 362/214; 362/305; 362/344; 362/346

[58] Field of Search ................. 362/61, 211, 214, 255, 362/256, 302, 304, 305, 344, 346

[56] References Cited

U.S. PATENT DOCUMENTS

| | | | |
|---|---|---|---|
| 1,887,574 | 11/1932 | Berg | 362/61 |
| 2,277,563 | 3/1942 | Scott | 362/255 |
| 3,818,210 | 6/1974 | Pitkjaan | 362/61 |
| 3,904,904 | 9/1975 | Meinecke | 362/256 |

*Primary Examiner*—Donald P. Walsh
*Attorney, Agent, or Firm*—Craig & Antonelli

[57] ABSTRACT

A motor vehicle headlight with a reflector consisting of two partial paraboloids arranged one above the other, which have at least approximately a common axis and of which the focus of the upper partial paraboloid is located closer to the apeces of the two partial paraboloids; a first filament for the low beam is located between the two foci of the two partial paraboloids while a second filament for the high beam is located in the focus of the lower partial paraboloid; the light emitted by the high-beam filament in the direction toward the upper partial paraboloid is shielded by a covering arranged on top of the high beam filament.

12 Claims, 2 Drawing Figures

MOTOR VEHICLE HEADLIGHT FOR LOW AND HIGH BEAMS

Figure 1:
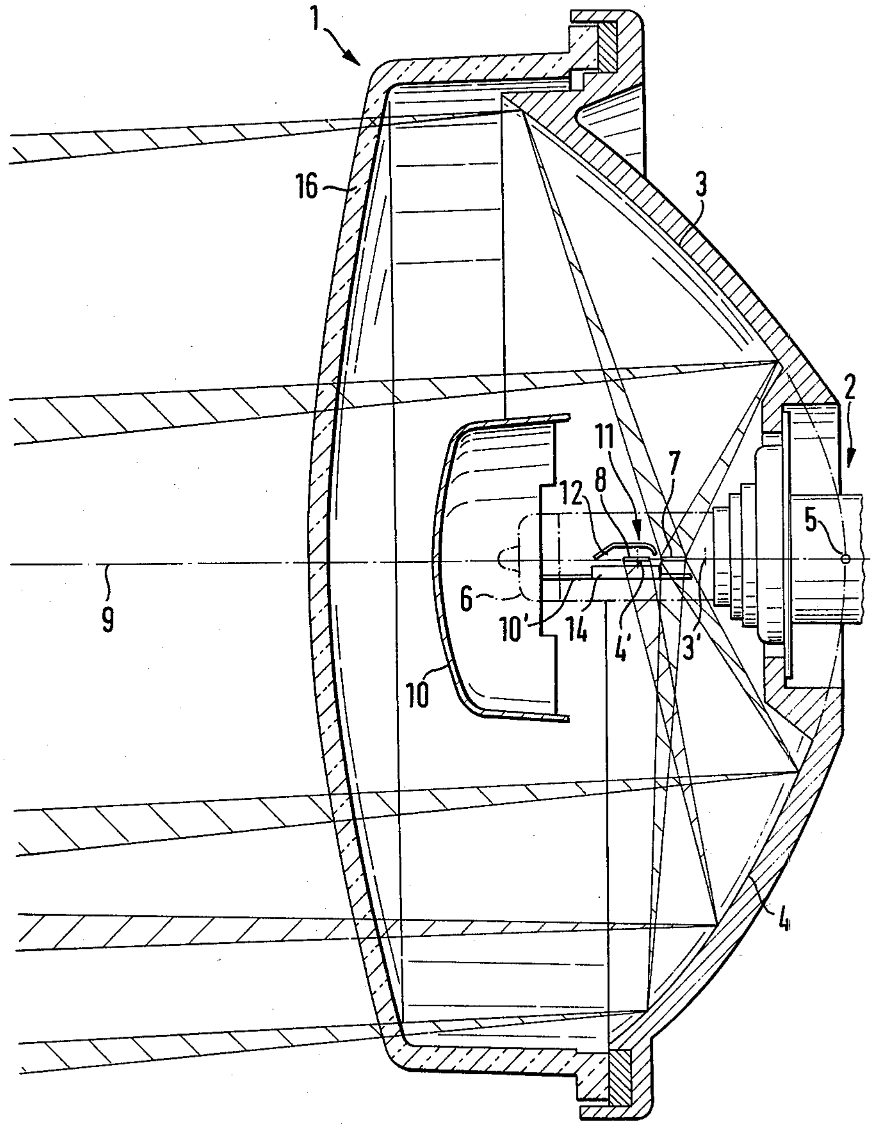

The present invention relates to a motor vehicle headlight with a reflector of two partial paraboloids arranged one above the other, which have at least approximately a common axis and of which the focus of the upper partial paraboloid is located closer to the apeces of the two partial paraboloids, with a first filament for the low beam between the foci of the two partial paraboloids, and with a second filament for the high beam in the focus of the lower partial paraboloid.

With such a headlight as disclosed in the German Offenlegungsschrift 14 97 320, the light emitted from the high beam filament into the upper partial paraboloids causes a bright near-field illumination i.e., an illumination of the area directly in front of the vehicle. As a result thereof, the eyes of the motor vehicle driver cannot readily and quickly adapt themselves to the great distance when turning on the high beam lights since the light quantity emitted from the high beam filament into the relatively small near-field is exactly as large as the light quantity which is supplied from this filament for the high beam distance illumination by way of the lower partial paraboloid. Therebeyond, when approaching a vehicle driving in the opposite direction, it will lead to a blinding of the driver of this vehicle when switching from low beam to high beam prior to passing this vehicle by the then brightly illuminated near-field.

The present invention is concerned with the task to provide a motor vehicle headlight of the aforementioned type in which a near-field illumination by the high beam filament is avoided in a constructively simple manner while maintaining the property of this headlight to produce the low beam with the aid of the entire reflector.

The underlying problems are solved according to the present invention by an at least approximately complete covering of the light emitted by the high beam filament in the direction toward the upper partial paraboloid. The light of the high beam filament which is located within the focus of the lower partial paraboloid is reflected into great distance by this partial paraboloid under avoidance of a near-field illumination. When switching from low beam to high beam and vice versa, the eyes of the vehicle user adapt themselves rapidly and safely to the illuminated distance. Therebeyond, a switching from low beam to high beam when approaching another vehicle is possible already shortly prior to the passage of the surrounding vehicle since the near-field is not illuminated by the high beam filament and therewith the driver of the oppositely moving vehicle is not blinded.

Compared to a separate covering in addition to filaments arranged separately or in one or in two incandescent lamps, it is constructively particularly simple to arrange at least a part of the covering together with the two filaments for low beam and high beam within a single incandescent lamp. The covering may be disposed particularly close to the high beam filament and as a result thereof is able to cover off with small dimensions at least a large portion of the light emitted in the direction of the upper partial paraboloid.

A particularly advantageous construction of the last-mentioned type of construction of the headlight exists if the incandescent lamp is a commercially available two-filament incandescent lamp with a light covering for one filament, if this filament produces the high beam and the other filament the low beam, and if possibly an additional shielding located outside of the incandescent lamp together with the light covering facing the upper partial paraboloid forms the covering of the high beam filament. The low beam and high beam filaments are interchanged in their function compared to the customary utilization of the two filament incandescent lamp in a headlight with a paraboloid reflector which as a rule is unitary. This means the filament utilized as a rule for the asymmetric low beam light supplies only high beam light whereas the customary high beam filament now produces low beam light with the aid of the entire reflector.

Furthermore, also the installed position of the two filament incandescent lamp is now selected in a particular manner according to the present invention. The position and location of the low beam filament in front of the focus of the upper partial paraboloid corresponds to the usual position in relation to the upper part of the paraboloid; the same is true for the high beam filament which is located in the focus of the other partial paraboloid, in relation to the lower part of the paraboloid. However, since the focus of the upper partial paraboloid in the headlight according to the present invention is closer to the summits or apeces of the two partial paraboloids than the focus of the lower partial paraboloid, the low beam filament lies to the rear of the focus of the lower partial paraboloid and the high beam filament in front of the focus of the upper partial paraboloid. Therebeyond, the two filament incandescent lamp is also rotated through approximately 180° about its longitudinal axis so that its light covering is no longer located below but above the one filament.

If the headlight includes a cover cap in front of the two filament incandescent lamp for light emitted directly from the filaments onto a light exit lens, then according to an advantageous construction of the present invention, the additional shielding is secured at a mounting support of the covering cap. A further constructive simplification resides in that the additional shielding, the cover cap and the mounting support thereof are made in one piece. The assembly and manufacture expenditures are thereby particularly low.

Accordingly, it is an object of the present invention to provide a low beam and high beam motor vehicle headlight which avoids by simple means the aforementioned shortcomings and drawbacks encountered in the prior art.

Another object of the present invention resides in a motor vehicle headlight for high and low beams in which a bright near-field illumination in front of the vehicle by the light reflected by the upper partial paraboloid is effectively prevented.

A further object of the present invention resides in a motor vehicle headlight which permits the eyes of the vehicle driver to adapt themselves by extremely simple means to great distance when switching to the high beam lights.

A still further object of the present invention resides in a motor vehicle headlight of the type described above which effectively precludes blinding of the driver of the oncoming vehicle even if the high beams are turned on again before the oncoming vehicle has completely passed the driver's vehicle.

Still another object of the present invention resides in a headlight for motor vehicles which permits the production of the low beam with the aid of the entire reflector yet precludes in an effective and simple manner any illumination of an area directly in front of the vehicle by the high beam filament.

A further object of the present invention resides in a motor vehicle headlight of the type described above which is simple in construction, relatively inexpensive in manufacture and relatively easy to install.

Figure 2:
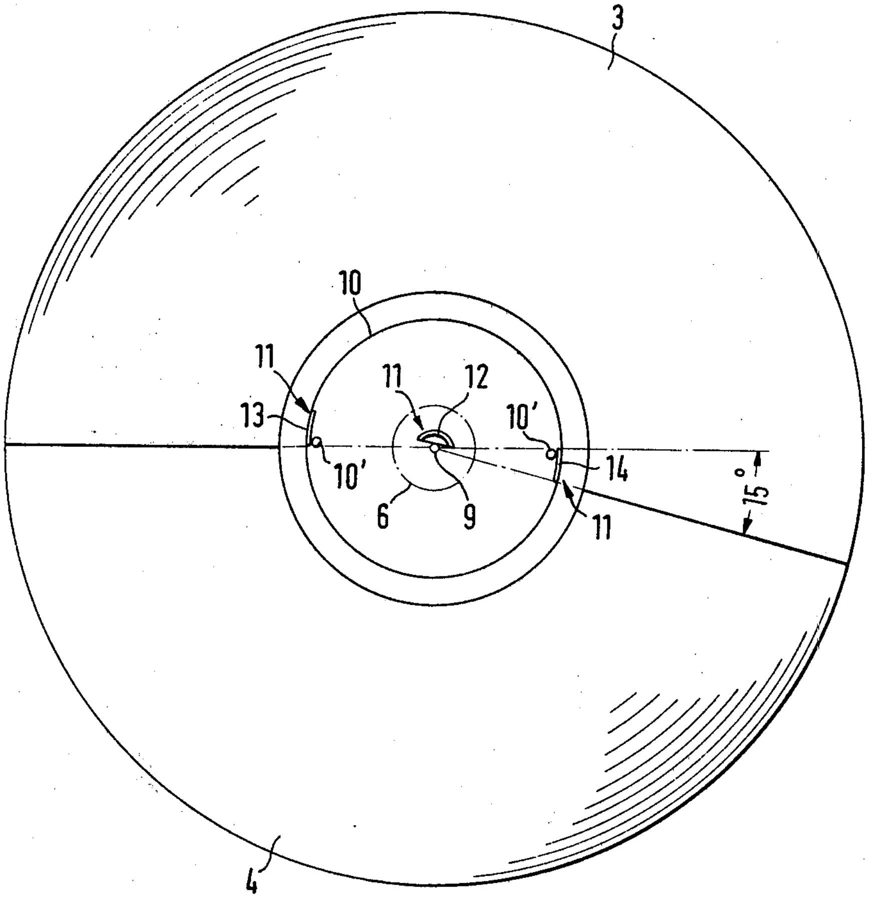

These and other objects, features and advantages of the present invention will become more apparent from the following description when taken in connection with the accompanying drawing which shows, for purposes of illustration only, one embodiment in accordance with the present invention, and wherein:

FIG. 1 is a somewhat schematic axial cross-sectional view through a headlight in accordance with the present invention having two partial paraboloids arranged one above the other and a two-filament incandescent lamp for the low beam and high beam; and FIG. 2 is a somewhat schematic front elevational view of the headlight of FIG. 1.

Referring now to the drawing wherein like reference numerals are used throughout the two views to designate like parts, a headlight generally designated by reference numeral 1 includes a reflector generally designated by reference numeral 2 consisting of two partial paraboloids 3 and 4 with a common apex or summit 5 and with a two-filament halogen incandescent lamp 6 having a filament 7 for the low beam and a filament 8 for the high beam. The two partial paraboloids 3 and 4 have different focal distances and a common axis 9. The focus of the upper partial paraboloid, i.e., its half parameter of, for example, 24 mm. is thereby smaller than the focal distance of the lower partial paraboloid which, for example, is equal to 36 mm. As can be seen from FIG. 2, the upper partial paraboloid 3 encloses a circumferential angle of 195° whereas the lower partial paraboloid 4 subtends a circumferential angle of about 165°.

The filament 7 is disposed on the axis 9 of the two partial paraboloids 3 and 4 at a predetermined distance of, for example, 7 mm. in front of the focus 3' of the upper partial paraboloid 3. The filament 8 is located in the focus 4' of the lower partial paraboloid 4. A hemispherically shaped covering cap 10 is secured at two lateral mounting members 10' in front of the incandescent lamp 6.

A covering generally designated by reference numeral 11 for the entire light emitted by the filament 8 in the direction toward the upper partial paraboloid 3 is arranged above the filament 8 respectively laterally thereof. The cover 11 consists of an antidazzling shield 12 inside of the incandescent lamp as well as of two additional sheet metal shielding members 13 and 14 outside of this incandescent lamp, which are arranged laterally with respect thereto and are constructed in one piece with the covering cap 10 and the mounting members 10' thereof.

The sheet metal shielding members 13 and 14 extend along the filament 8 and complete the antidazzling shield 12, which subtends an angle of 165°, to the angle of 195°, i.e., to the circumferential angle of the upper partial paraboloid 3. As a result thereof, light is emitted from the filament 8 exclusively into the lower partial paraboloid 4.

With a turned-on low beam light, the filament 7 emits the light into both partial paraboloids 3 and 4. The light leaves through a diffusion lens 16 indicated in FIG. 1, reflected from the two partial paraboloids 3 and 4 under an angle of about 6° asymmetrically with a bright-dark limit on the side opposite the counter-traffic and inclined at an angle of about 15° with respect to the horizontal and illuminates the low beam area with nearly the entire light intensity of the filament 7.

When switching to high beam, the turned-on filament 8 which may possibly be turned on together with the filament 7, emits light exclusively into the lower partial paraboloid 4, which illuminates a distant area under avoidance of an undesired near-field illumination and possibly together with a further high beam headlight.

As alternative to the illustrated embodiment, the two partial paraboloids may also be arranged with mutually offset apeces. The partial paraboloids may even possess the same focal distance.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A motor vehicle headlight, comprising a reflector means including two partial paraboloids arranged one above the other, the focus of the upper partial paraboloid being located closer to the apeces of the two partial paraboloids, a first filament means for producing a low beam, said first filament means being located between the two foci of the two partial paraboloids, and a second filament means for producing a high beam, said second filament means being located substantially within the focus of the lower partial paraboloid, characterized by a covering means for shielding the light emitted by the second filament means in the direction toward the upper partial paraboloid whereby near-field illumination by the high beam is avoided.

2. A headlight according to claim 1, characterized in that the two partial paraboloids have at least approximately a common axis.

3. A headlight according to claim 1 or 2, characterized in that at least a portion of the covering means is arranged together with the filament means for low beam and high beam within an incandescent lamp.

4. A headlight according to claim 3, characterized in that said part of the covering means is an antidazzle shield.

5. A headlight according to claim 3, characterized in that the incandescent lamp is a commercial two-filament incandescent lamp with a covering means for one filament means, said last-mentioned filament means producing the high beam and the other filament means producing the low beam.

6. A headlight according to claim 5, characterized in that an additional shielding means outside of the incandescent lamp together with the portion of the light covering means facing the upper partial paraboloid form the covering means for the high beam filament means.

7. A headlight according to claim 6, with a cover cap in front of the incandescent lamp for light emitted directly by the filament means onto a light exit lens, characterized in that the additional shielding means is secured at a mounting means of the cover cap.

8. A headlight according to claim 7, characterized in that the additional shielding means, the cover cap and the mounting means are made in one piece.

9. A headlight according to claim 1, characterized in that the incandescent lamp is a commercial two-filament incandescent lamp with a covering means for one filament means, said last-mentioned filament means producing the high beam and the other filament means producing the low beam.

10. A headlight according to claim 9, characterized in that an additional shielding means outside of the incandescent lamp together with the portion of the light covering means facing the upper partial paraboloid form the covering means for the high beam filament means.

11. A headlight according to claim 10, with a cover cap in front of the incandescent lamp for light emitted directly by the filament means onto a light exit lens, characterized in that the additional shielding means is secured at a mounting means of the cover cap.

12. A headlight according to claim 11, characterized in that the additional shielding means, the cover cap and the mounting means are made in one piece.

* * * * *